US012413267B2

(12) United States Patent
Wang et al.

(10) Patent No.: US 12,413,267 B2
(45) Date of Patent: Sep. 9, 2025

(54) RESOURCE ALLOCATION METHOD AND APPARATUS, COMMUNICATION SYSTEM, AND STORAGE MEDIUM

(71) Applicant: HUAWEI TECHNOLOGIES CO., LTD., Shenzhen (CN)

(72) Inventors: Xuefeng Wang, Dongguan (CN); Qinghua Lan, Dongguan (CN); Qiang Xu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 669 days.

(21) Appl. No.: 17/730,808

(22) Filed: Apr. 27, 2022

(65) Prior Publication Data

US 2022/0255589 A1  Aug. 11, 2022

Related U.S. Application Data

(63) Continuation of application No. PCT/CN2020/120283, filed on Oct. 12, 2020.

(30) Foreign Application Priority Data

Oct. 29, 2019 (CN) .......................... 201911039327.9

(51) Int. Cl.
*H04B 7/024* (2017.01)
*H04B 7/0408* (2017.01)
(Continued)

(52) U.S. Cl.
CPC .......... *H04B 7/024* (2013.01); *H04B 7/0408* (2013.01); *H04B 7/0452* (2013.01); *H04W 92/10* (2013.01)

(58) Field of Classification Search
CPC .... H04B 7/024; H04B 7/0408; H04B 7/0452; H04B 7/15542; H04B 7/0413;
(Continued)

(56) References Cited

U.S. PATENT DOCUMENTS 10,015,811 B1    7/2018  Pawar et al.
10,149,225 B1*  12/2018  Oroskar ............... H04B 17/336
(Continued)

FOREIGN PATENT DOCUMENTS

CN     101820680 A    9/2010
CN     101933270 A    12/2010
(Continued)

OTHER PUBLICATIONS

Extended European Search Report issued in corresponding European Application No. 20883569.4, dated Nov. 3, 2022, pp. 1-15.
(Continued)

*Primary Examiner* — Rina C Pancholi
(74) *Attorney, Agent, or Firm* — HAUPTMAN HAM, LLP

(57) ABSTRACT

A resource allocation method is applied to a communication system based on massive MIMO. The method includes: A donor eNodeB detects whether a target terminal exists in a donor cell, where a correlation between a wireless air interface channel of the target terminal and a wireless air interface channel of a relay node is greater than a target threshold; and if the target terminal does not exist, the donor eNodeB determines, for the relay node through resource spatial multiplexing, one or more beams used for data backhaul, where the one or more beams are beams formed by a massive antenna array of the donor eNodeB through air interface beamforming.

15 Claims, 3 Drawing Sheets

(51) Int. Cl.
*H04B 7/0452* (2017.01)
*H04W 92/10* (2009.01)

(58) Field of Classification Search
CPC . H04W 92/10; H04W 84/047; H04W 72/046; H04W 72/535; H04L 5/0035
See application file for complete search history.

(56) References Cited

U.S. PATENT DOCUMENTS

| | | | |
|---|---|---|---|
| 10,225,724 B1* | 3/2019 | Pawar | H04W 76/10 |
| 2007/0153734 A1 | 7/2007 | Lee et al. | |
| 2008/0045144 A1 | 2/2008 | Fujita | |
| 2013/0034040 A1 | 2/2013 | Priotti | |
| 2013/0034043 A1 | 2/2013 | Yu et al. | |
| 2014/0204846 A1* | 7/2014 | Maltsev | H04W 92/045 370/329 |
| 2016/0374138 A1* | 12/2016 | Dai | H04W 76/15 |
| 2017/0208574 A1 | 7/2017 | Ramakrishna et al. | |
| 2018/0351668 A1 | 12/2018 | Kim | |

FOREIGN PATENT DOCUMENTS

| | | |
|---|---|---|
| CN | 102356663 A | 2/2012 |
| CN | 102484515 A | 5/2012 |
| CN | 101296013 B | 7/2012 |
| CN | 102948234 A | 2/2013 |
| CN | 103155670 A | 6/2013 |
| CN | 103442366 A | 12/2013 |
| CN | 103875297 A | 6/2014 |
| CN | 102300242 B | 8/2014 |
| CN | 104982078 A | 10/2015 |
| CN | 105191166 A | 12/2015 |
| CN | 106162929 A | 11/2016 |
| CN | 107534469 A | 1/2018 |
| CN | 108810902 A | 11/2018 |
| CN | 109155644 B | 11/2021 |
| WO | 2015096097 A1 | 7/2015 |

OTHER PUBLICATIONS

International Search Report issued in corresponding International Application No. PCT/CN2020/120283, dated Aug. 18, 2021, pp. 1-9.

* cited by examiner

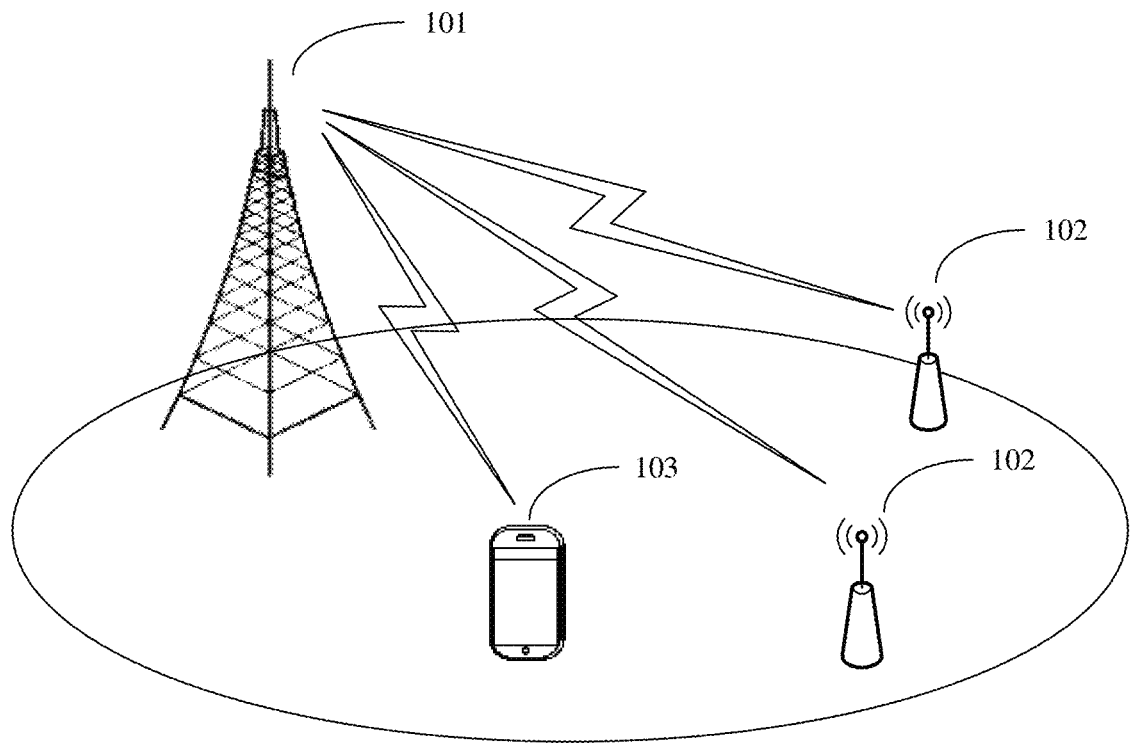

FIG. 1

A donor eNB DeNB detects whether a target terminal exists in a donor cell, where a correlation between a wireless air interface channel of the target terminal and a wireless air interface channel of a relay node RN meets a target threshold, and the correlation is used to indicate a channel interference degree between the target terminal and the relay node RN  — 201

If the target terminal does not exist, the donor eNB DeNB determines one or more beams for the relay node RN through resource spatial multiplexing, where the one or more beams are beams formed by a massive antenna array of the donor eNB DeNB through air interface beamforming, and the one or more beams are used by the relay node RN to perform data backhaul  — 202

FIG. 2

RESOURCE ALLOCATION METHOD AND APPARATUS, COMMUNICATION SYSTEM, AND STORAGE MEDIUM

CROSS-REFERENCE TO RELATED APPLICATIONS

This application is a continuation of International Application No. PCT/CN2020/120283, filed on Oct. 12, 2020. The International Application claims priority to Chinese Application No. 201911039327.9, filed on Oct. 29, 2019. The disclosures of the aforementioned applications are hereby incorporated entirely by reference.

BACKGROUND

With increasing deployment of wireless base stations, an area in which wired transmission are unable to be constructed and an area that does not have a condition for construction use wireless backhaul for transmission construction. Microwave backhaul and wireless relay (relay) backhaul are two means. Currently, base station wireless backhaul mainly uses microwave. Microwave backhaul is mainly applicable to a line of sight (line of sight, LOS) scenario, and meets a point-to-point large-bandwidth wireless transmission condition. However, in a non-line of sight (NLOS) scenario, various types of blocking greatly affect attenuation performance of a microwave backhaul signal. Consequently, a communication link is unable to be established between a donor eNodeB (DeNB) and a relay node (RN). Therefore, a new NLOS relay backhaul technology is useful as a transmission bearer technology of a relay base transceiver station. In a current networking architecture of a base station network for wireless relay backhaul, a donor cell configures an F1 frequency as a service bearer frequency of a wireless backhaul module (remote relay node, RRN) and user equipment (user equipment, UE). The relay base transceiver station (relay base transceiver station, ReBTS) establishes a backhaul link to the DeNB through the RRN. The relay base transceiver station cell configures a frequency F2 as a service bearer frequency of the UE. The UE establishes an access link to the relay base transceiver station through F2.

Currently, in this architecture, a conventional technology is mainly implemented in an LTE-based traditional single wide beam network. This greatly affects a capacity of a DeNB. After a relay base transceiver station is added, user experience in the DeNB is degraded.

SUMMARY

Embodiments of this application provide a resource configuration method. The method is applied to a communication system based on massive MIMO, to increase an air interface resource multiplexing degree, reduce impact on an ordinary terminal device in a donor cell while improving a backhaul capability of a RN, and improve a capacity of an entire system.

In view of this, a first aspect of this application provides a resource allocation method. The method is applied to a communication system based on massive MIMO. The communication system includes a DeNB and one or more relay nodes RNs. The method includes: The DeNB detects whether a target terminal exists in a donor cell, where a correlation between a wireless air interface channel of the target terminal and a wireless air interface channel of the RN is greater than a target threshold, and the correlation is used to indicate a channel interference degree between the wireless air interface channel of the target terminal and the wireless air interface channel of the RN; and if the target terminal does not exist, the DeNB determines one or more beams for the RN through resource spatial multiplexing, where the one or more beams are beams formed by a massive antenna array of the DeNB through air interface beamforming, and the one or more beams are used by the RN to perform data backhaul.

As is learned from the first aspect, the DeNB performs air interface resource scheduling on the RN and an ordinary terminal device in different beams based on a massive MIMO technology. In this way, an air interface resource multiplexing degree is increased, impact on the ordinary terminal device in the donor cell is reduced while a backhaul capability of the RN is improved, and a capacity of an entire system is improved.

Optionally, with reference to the first aspect, in a first possible implementation of the first aspect, after the DeNB detects whether a target terminal exists in a donor cell, the method further includes: If the target terminal exists, the DeNB determines an air interface resource allocation manner for the RN and the target terminal by using a scheduling optimization algorithm, so that a total system capacity of the donor cell meets a preset condition.

From the second aspect that when the target terminal having a large correlation with the wireless air interface channel of the RN exists, the scheduling optimization algorithm with an optimal total system capacity is used to properly schedule the RN and the target terminal, so that the total system capacity becomes optimal and system efficiency is the highest.

Optionally, with reference to the first possible implementation of the first aspect, in a second possible implementation of the first aspect, that the DeNB determines an air interface resource allocation manner for the RN and the target terminal by using a scheduling optimization algorithm, so that a total system capacity of the donor cell meets a preset condition includes: The DeNB separately determines a first prediction value and a second prediction value of the total system capacity, where the first prediction value is a total system capacity corresponding to a first air interface resource allocation manner, and the second prediction value is a total system capacity corresponding to a second air interface resource allocation manner; in the first air interface resource allocation manner, air interface resources of a same beam are allocated to the RN and the target terminal based on a preset proportion, and the air interface resource includes a spectrum resource and a power resource, such as a physical resource block PRB resources; in the second air interface allocation manner, the air interface resources of the same beam are allocated to the RN and the target terminal in a sequence of priorities; and a priority of the RN is higher than a priority of the target terminal; and determines the air interface resource allocation manner for the RN and the target terminal based on the first prediction value and the second prediction value.

Optionally, with reference to the second possible implementation of the first aspect above, in a third possible implementation of the first aspect, that the DeNB determines the air interface resource allocation manner for the RN and the target terminal based on the first prediction value and the second prediction value includes: The DeNB determines whether the first prediction value is greater than the second prediction value; and if the first prediction value is greater than or equal to the second prediction value, determines that the air interface resource allocation manner for the RN and the target terminal is the first air interface resource allocation manner; or if the first prediction value is less than the second prediction value, determines that the air interface resource allocation manner for the RN and the target terminal is the second air interface resource allocation manner.

Optionally, with reference to any one of the first to the third possible implementations of the first aspect, in a fourth possible implementation of the first aspect, the total system capacity is a sum of a cell capacity of the donor cell and a cell capacity corresponding to the RN.

A second aspect of this application provides a resource allocation apparatus. The apparatus includes: a detection module, configured to detect whether a target terminal exists in a donor cell, where a correlation between a wireless air interface channel of the target terminal and a wireless air interface channel of a RN is greater than a target threshold, and the correlation is used to indicate a channel interference degree between the wireless air interface channel of the target terminal and the wireless air interface channel of the RN; and a determining module, configured to: when the detection module detects that the target terminal does not exist, determine one or more beams for the RN through resource spatial multiplexing, where the one or more beams are beams formed by a massive antenna array of the DeNB through air interface beamforming, and the one or more beams are used by the RN to perform data backhaul.

Optionally, with reference to the second aspect, in a first possible implementation of the second aspect, the determining module is further configured to: when the detection module detects that the target terminal exists, determine a resource allocation manner for the RN and the target terminal by using a scheduling optimization algorithm, so that a total system capacity of the donor cell meets a preset condition.

Optionally, with reference to the first possible implementation of the second aspect described above, in a second possible implementation of the second aspect, the determining module is configured to: when the detection module detects that the target terminal exists, separately determine a first prediction value and a second prediction value of the total system capacity, where the first prediction value is a total system capacity corresponding to a first air interface resource allocation manner, and the second prediction value is a total system capacity corresponding to a second air interface resource allocation manner; in the first air interface resource allocation manner, air interface resources of a same beam are allocated to the RN and the target terminal based on a preset proportion; in the second air interface resource allocation manner, the air interface resources of the same beam are allocated to the RN and the target terminal in a sequence of priorities; and a priority of the RN is higher than a priority of the target terminal; determine the resource allocation manner for the RN based on the first prediction value and the second prediction value; and determine the air interface resource allocation manner for the RN and the target terminal based on the first prediction value and the second prediction value.

Optionally, with reference to the second possible implementation of the second aspect above, in a third possible implementation of the second aspect, the determining module is configured to: determine whether the first prediction value is greater than the second prediction value; and if the first prediction value is greater than or equal to the second prediction value, determine that the resource allocation manner for the RN and the target terminal is the first air interface resource allocation manner; or if the first prediction value is less than the second prediction value, determine that the air interface resource allocation manner for the RN and the target terminal is the second air interface resource allocation manner.

Optionally, with reference to any one of the first to the third possible implementations of the second aspect, in a fourth possible implementation of the second aspect, the total system capacity is a sum of a cell capacity of the donor cell and a cell capacity corresponding to the RN.

A third aspect of this application provides a network device. The network device includes a processor and a memory. The memory is configured to store computer-readable instructions (or referred to as a computer program), and the processor is configured to read the computer-readable instructions to implement the method that is related to the network device and that is provided in any one of the foregoing aspects and the implementations thereof.

In some implementations, the network device further includes a transceiver, configured to receive and send data.

A fourth aspect of this application provides a computer storage medium. The computer storage medium is non-volatile. The computer storage medium stores computer-readable instructions. When the computer-readable instructions are executed by a processor, the method according to the first aspect or any possible implementation of the first aspect is implemented.

According to the resource configuration method used in the embodiments of this application, air interface resource scheduling is performed on the RN and an ordinary terminal device in different beams based on a massive MIMO technology. In this way, an air interface resource multiplexing degree is increased, impact on the ordinary terminal device in the donor cell is reduced while a backhaul capability of the RN is improved, and a capacity of an entire system is improved.

BRIEF DESCRIPTION OF DRAWINGS

FIG. 1 is a schematic diagram of a structure of a communication system according to an embodiment of this application;

FIG. 2 is a schematic diagram of an embodiment of a resource configuration method according to an embodiment of this application;

DESCRIPTION OF EMBODIMENTS

Figure 3:
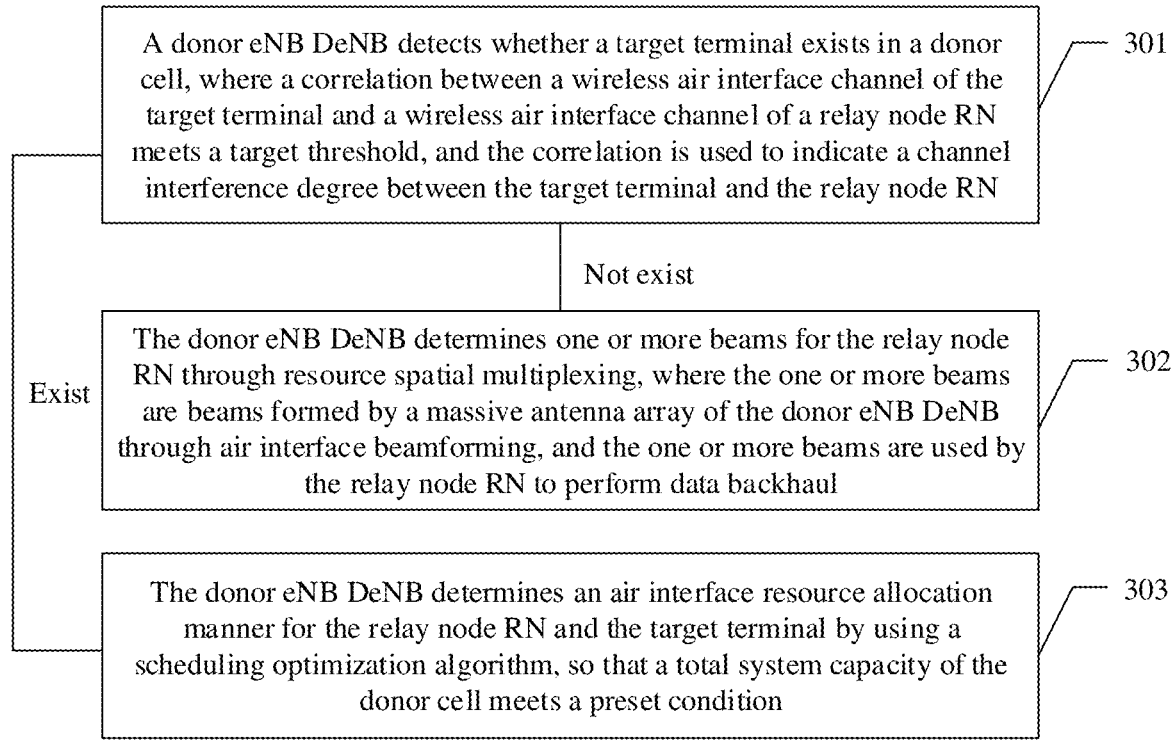
FIG. 3 is a schematic diagram of another embodiment of a resource configuration method according to an embodiment of this application.

To make objectives, technical solutions, and advantages of the present disclosure clearer, the following further describes the embodiments of this application with reference to the accompanying drawings. The described embodiments are some rather than all the embodiments of the present disclosure. A person of ordinary skill in the art is able to learn that, as a new application scenario emerges, the technical solutions provided in the embodiments of the present disclosure are further applicable to a similar technical problem.

In the specification, claims, and the accompanying drawings of this application, the terms "first", "second", and the like are intended to distinguish between similar objects but do not necessarily indicate a specific order or sequence. The data termed in such a way are interchangeable in proper circumstances so that the embodiments described herein are implemented in other orders than the order illustrated or described herein. In addition, terms "include" and "have" and any variations thereof are intended to cover non-exclusive inclusions, for example, a process, method, system, product, or device including a series of steps or modules need not be limited to those clearly listed steps or modules, but in some embodiments include other steps or modules that are not clearly listed or are inherent to these processes, methods, products, or devices. Naming or numbering of steps in this application does not mean that steps in the method procedure need to be performed according to a time/logical order indicated by the naming or numbering. An execution order of process steps that have been named or numbered is changed based on a technical objective to be implemented, provided that a same or similar technical effect are achieved. Division into the modules in this application is logical division. During implementation in an actual application, another division manner is used. For example, a plurality of modules are combined or integrated into another system, or some features are ignored or not executed. In addition, the displayed or discussed mutual couplings or direct couplings or communication connections are implemented by using some interfaces. The indirect couplings or communication connections between the modules are implemented in electronic or other similar forms. This is not limited in this application. In addition, modules or submodules described as separate components are or are not physically separated, or are or are not physical modules, or is distributed on a plurality of circuit modules. Objectives of the solutions of this application is achieved by selecting some or all the modules based on actual demands.

According to a resource configuration method provided in the embodiments of this application, a DeNB performs resource scheduling on a RN and an ordinary terminal device in different beams based on a massive MIMO technology. In this way, an air interface resource multiplexing degree is increased, impact on the ordinary terminal device in a donor cell is reduced while a backhaul capability of a relay base station is improved, and a capacity of an entire system is improved. The embodiments of this application further provide a corresponding resource configuration apparatus. Details are described in the following.

An embodiment of this application first provides a schematic diagram of an architecture of a communication system, as shown in FIG. 1.

Refer to FIG. 1. The communication system provided in this embodiment of this application is a communication system based on massive MIMO. The communication system includes: a DeNB 101, a RN 102, and a terminal device 103. When the communication system includes a core network, the DeNB 101 further is connected to the core network. The DeNB 101 further communicates with an internet protocol (internet protocol, IP) network, for example, an internet (Internet), a private IP network, or another data network. The DeNB 101 has a relay (relay) function, and supports access of the relay node 102 and the ordinary terminal device 103 within coverage. The DeNB 101 in this embodiment of this application is an evolved NodeB (evolved node B, eNB, or eNodeB) in an LTE system or a wireless access device in a 5G network, or is a satellite base station in a satellite communication system. In this embodiment of this application, the DeNB 101 and the relay base station 102 both support a massive multiple-input multiple-output (massive multiple-input multiple-output, massive MIMO) technology, the coverage of the DeNB 101 is referred to as a donor cell, and the DeNB 101 is configured with a massive MIMO antenna array. An array size of the massive MIMO antenna array configured for the DeNB 101 is 8T8R to 32T32R. Optionally, the massive MIMO antenna array alternatively is an antenna array with a higher order such as 64T64R or 128T128R. This is not limited in this embodiment of this application. In this embodiment of this application, the relay node 102 includes a wireless backhaul module (remote relay node, RRN) and a relay base transceiver station (relay base transceiver station, ReBTS). The RRN accesses the DeNB by using a wireless signal and establishes an air interface bearer. The relay base transceiver station ReBTS provides access of a terminal device within the coverage. Transmission of the relay base transceiver station ReBTS is provided by the RRN. A backhaul link is established between the DeNB 101 and the relay node 102 to implement a wireless backhaul function and implement service backhaul of the relay base station.

In the donor cell in this embodiment of this application, the 101 corresponds to one relay node 102, or corresponds to a plurality of relay nodes 102. This is not limited in this embodiment of this application. In the communication system shown in FIG. 1, two relay nodes 102 are shown, in other words, two relay nodes 102 are deployed in the donor cell of the DeNB 101. In this embodiment of this application, the DeNB 101 further provides wireless access for one or more terminal devices 103 in the donor cell. A quantity of terminal devices 103 in the donor cell is not limited in this embodiment of this application. FIG. 1 is an example and not to be construed as a limitation on this application.

The terminal device 103 in this application is user equipment UE, an access terminal, a user unit, a user station, a mobile station, a mobile site, a remote station, a remote terminal, a mobile device, a user terminal, a terminal, a wireless communication device, a user agent, or a user apparatus. The terminal device 103 accesses a network through an air interface and initiate services such as a call and internet access, and is a mobile device supporting 5G new radio (NR, new radio). Typically, the terminal device 103 is a mobile phone, a tablet computer, a portable notebook computer, a virtual/mixed/augmented reality device, a navigation device, a ground base station (for example, an eNB or a gNB), a ground station (ground station, GS), a session initiation protocol (Session Initiation Protocol, SIP) phone, a wireless local loop (Wireless Local Loop, WLL) station, a personal digital assistant (Personal Digital Assistant, PDA), a handheld device with a communication function, a computing device, another processing device connected to a wireless modem, a vehicle-mounted device, a wearable device, a terminal device in a 5G network, a terminal device in a future evolved public land mobile communication network (Public Land Mobile Network, PLMN) or another future communication system, or the like.

FIG. 2 is a schematic diagram of an embodiment of a resource configuration method according to an embodiment of this application. The resource configuration method is applied to the communication system shown in FIG. 1.

Refer to FIG. 2. An embodiment of the resource configuration method provided in this embodiment of this application includes the following steps.

201: A DeNB detects whether a target terminal exists in a donor cell, where a correlation between a wireless air interface channel of the target terminal and a wireless air interface channel of a RN is greater than a target threshold, and the correlation is used to indicate a channel interference degree between the wireless air interface channel of the target terminal and the wireless air interface channel of the RN.

In this embodiment of this application, the donor cell corresponding to the DeNB is a massive MIMO cell, and one or more relay nodes RNs are deployed in the donor cell. In addition to providing wireless access and implementing service backhaul for the one or more relay nodes RNs, the DeNB further provides a communication service of wireless access for one or more terminal devices in the donor cell.

The RN in this embodiment of this application is any one of the one or more relay nodes RNs included in the donor cell. The target terminal in this embodiment of this application is one or more of the one or more terminals included in the donor cell. In this embodiment of this application, the RN accesses the donor cell as a special terminal device. In a wireless access process, the DeNB identifies identities of the RN and the ordinary terminal device to distinguish the RN and an ordinary terminal device between the terminal device. A manner in which the DeNB distinguishes between the RN and the terminal device is not limited in this embodiment of this application.

In this embodiment of this application, after identifying the RN, the DeNB first detects whether the target terminal exists in the donor cell, where the correlation between the wireless air interface channel of the target terminal and the wireless air interface channel of the RN is greater than the target threshold. In this embodiment of this application, a correlation between wireless air interface channels of two terminal devices or a correlation between a wireless air interface channel of a terminal device and the wireless air interface channel of the RN is used to indicate a channel interference degree between wireless air interface channels of the two. When the correlation between wireless air interface channels of two terminal devices or a terminal device and the RN is small, such as, less than or equal to a preset target threshold, a consideration is that a channel interference degree between the two terminal devices or the terminal device and the RN is small. Therefore, the two terminal devices or the terminal device and the RN each occupies one separate beam to enjoy a spatial multiplexing gain of a MIMO system. When the correlation between two terminal devices or between a terminal device and the RN is large, such as, greater than a preset target threshold, a consideration is that a channel interference degree between the two terminal devices or between the terminal device and the RN is large. Therefore, an air interface resource in a same beam needs to be shared. In this embodiment of this application, an air interface resource includes a spectrum resource, a power resource, and the like, for example, a physical resource block (physical resource block, PRB) resource. In this embodiment of this application, a manner in which the DeNB detects whether the target terminal exists in the donor cell is polling terminal devices in the donor cell after identifying the RN, to find the target terminal from the terminal devices, where the correlation between the target terminal and the RN is greater than the target threshold.

A manner in which the DeNB detects the correlation between the wireless air interface channel of the RN and the wireless air interface channel of the terminal device is not limited in this embodiment of this application.

202: If the target terminal does not exist, the DeNB determines one or more beams for the RN through resource spatial multiplexing, where the one or more beams are beams formed by a massive antenna array of the DeNB through air interface beamforming, and the one or more beams are used by the RN to perform data backhaul.

The donor cell in this embodiment of this application is a massive MIMO cell and uses a massive array antenna technology, and therefore, supports multi-stream spatial multiplexing of a channel resource. In this embodiment of this application, the DeNB is configured to use a high-order MIMO technology such as 8T8R, 16T16R, 32T32R, or 64T64R. When a quantity of transmit antennas configured in the donor cell is m, data x1, x2, . . . , and xm are sent. When a quantity of receive antennas is n, received data is y1, y2, . . . , and ym, and a theoretical quantity of spatial multiplexing streams supported by the entire system is min(m, n).

In this embodiment of this application, when the DeNB detects that the target terminal whose correlation with the RN is greater than the target threshold does not exist in the donor cell, the DeNB allocates, through resource spatial multiplexing, one or more beams for the RN to perform data backhaul. The one or more beams are beams formed by a massive antenna array of the DeNB through air interface beamforming. In other words, the RN separately occupies one or more beams to perform data backhaul by using one or more streams of spatial multiplexing.

In the embodiments of this application, air interface resource scheduling is performed on the RN and an ordinary terminal device in different beams by using a massive MIMO technology. In this way, an air interface resource multiplexing degree is increased, impact on the ordinary terminal device in the donor cell is reduced while a backhaul capability of the RN is improved, and a capacity of an entire system is improved.

FIG. 3 is a schematic diagram of another embodiment of a resource configuration method according to an embodiment of this application.

Refer to FIG. 3. The another embodiment of the resource configuration method provided in this embodiment of this application includes the following steps.

301: A DeNB detects whether a target terminal exists in a donor cell, where a correlation between a wireless air interface channel of the target terminal and a wireless air interface channel of a RN meets a target threshold, and the correlation is used to indicate a channel interference degree between the wireless air interface channel of the target terminal and the wireless air interface channel of the RN.

For understanding of this embodiment of this application, refer to step 201 in FIG. 2. Details are not described herein again.

302: If the target terminal does not exist, the DeNB determines one or more beams for the RN through resource spatial multiplexing, where the one or more beams are beams formed by a massive antenna array of the DeNB through air interface beamforming, and the one or more beams are used by the RN to perform data backhaul.

For understanding of this embodiment of this application, refer to step 202 in FIG. 2. Details are not described herein again.

303: If the DeNB detects that the target terminal exists, the DeNB determines an air interface resource allocation manner for the RN and the target terminal by using a scheduling optimization algorithm, so that a total system capacity of the donor cell meets a preset condition.

In this embodiments of this application, when the DeNB detects that the target terminal exists, the DeNB determines the air interface resource allocation manner for the RN and the target terminal by using the scheduling optimization algorithm, so that the total system capacity of the donor cell meets the preset condition. In this embodiment of this application, the preset condition is that the total system capacity of the donor cell is optimal; and the scheduling optimization algorithm is a series of cell performance optimization algorithms used to calculate the optimal total system capacity of the donor cell.

Figure 4:
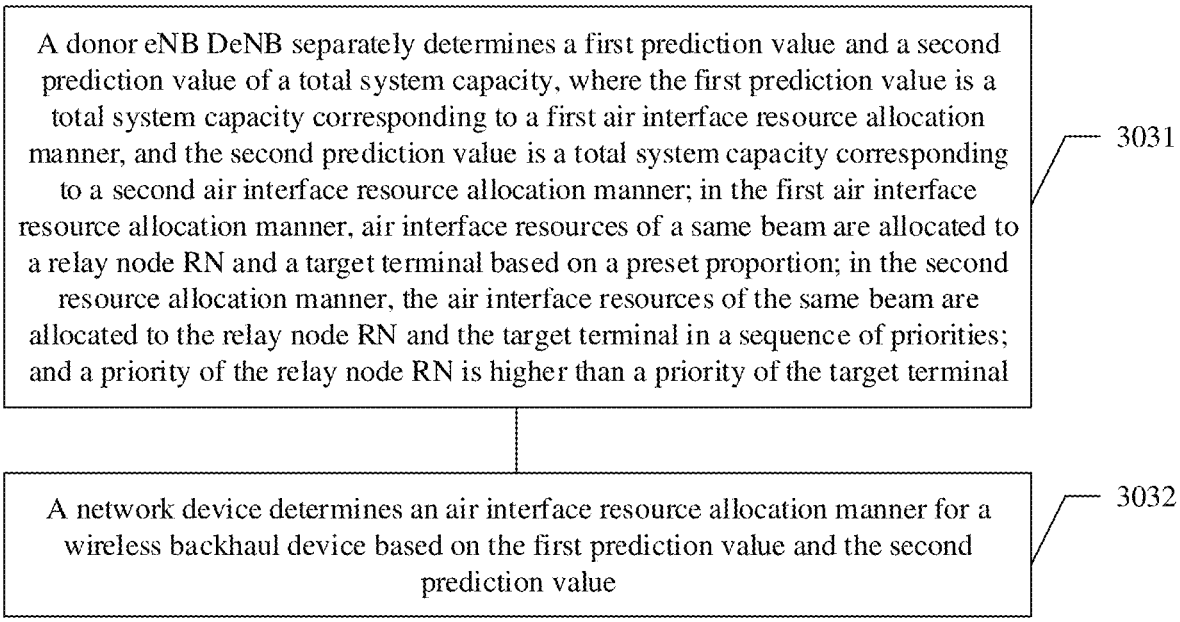
FIG. 4 is a schematic diagram of an embodiment in which a DeNB determines an air interface resource allocation manner for a RN and a target terminal by using a scheduling optimization algorithm according to an embodiment of this application.

In this embodiment of this application, the DeNB determines the air interface resource allocation manner for the RN and the target terminal by using a procedure of the following scheduling optimization algorithm, so that the DeNB performs resource scheduling for the RN and the target terminal in the air interface resource allocation manner, and finally, the total system capacity of the donor cell are optimal. FIG. 4 is a schematic diagram of an embodiment in which a DeNB determines an air interface resource allocation manner for a RN and a target terminal by using a scheduling optimization algorithm according to an embodiment of this application. The embodiment includes the following step.

3031: The DeNB separately determines a first prediction value and a second prediction value of the total system capacity, where the first prediction value is a total system capacity corresponding to a first air interface resource allocation manner, and the second prediction value is a total system capacity corresponding to a second air interface resource allocation manner; in the first air interface resource allocation manner, air interface resources of a same beam are allocated to the RN and the target terminal based on a preset proportion; in the second resource allocation manner, the air interface resources of the same beam are allocated to the RN and the target terminal in a sequence of priorities; and a priority of the RN is higher than a priority of the target terminal.

In this embodiment of this application, when the DeNB detects that the target terminal whose correlation with the RN is greater than the target threshold exists in the donor cell, the RN and the target terminal neither occupies a separate beam, and need to share air interface resources corresponding to a same beam. A PRB resource is used as an example. There is a correspondence between an air interface bandwidth of a beam and a quantity of PRB resources. After a value of a spectrum bandwidth is determined, the quantity of PRB resources is further determined. For example, when a system bandwidth is 1.4 MHz, there are six PRBs in a beam. Therefore, the six PRB resources need to be allocated to the RN and the target terminal for use according to a rule, and a total quantity of PRB resources allocated to the RN and the target terminal for use is unable to exceed 6.

In this embodiment of this application, there are two methods for sharing air interface resources corresponding to a same beam, such as, a first air interface resource allocation manner and a second air interface resource allocation manner. In the first air interface resource allocation manner, air interface resources of a same beam are allocated to the RN and the target terminal based on a preset proportion. For example, when the preset proportion is 50%, air interface resources such as PRBs in the beam are evenly divided into two shares. One share is used by the target terminal for random access, and the other share is used by the RN for data transmission. When the RN and the target terminal are in a busy state, the RN and the target terminal is configured to use the air interface resources such as PRBs that are allocated based on the preset proportion. The RN is configured to use air interface resources such as PRBs of the target terminal when the RN is in the busy state and the target terminal is in an idle state. In the second air interface resource allocation manner, air interface resources such as PRBs of a same beam are allocated to the RN and the target terminal in a sequence of priorities, where a priority of the RN is higher than a priority of the target terminal. The DeNB first meets an air interface resource condition such as a PRB of the RN, and then allocates a remaining air interface resource such as a remaining PRB in a beam to the target terminal for use. A PRB resource is used as an example. When there are six PRBs in a beam, if the RN and the target terminal each need five PRBs, the DeNB first allocates five PRBs configured to be used by the RN to the RN, and then allocates one remaining PRB to the target terminal for use.

In this embodiment of this application, the total system capacity is a sum of a cell capacity of the donor cell and a cell capacity of a cell corresponding to the RN. The cell capacity of the cell corresponding to the RN is equivalent to backhaul performance of the RN.

In this embodiment of this application, when the DeNB detects that the target terminal whose correlation with the wireless air interface channel of the RN is greater than the target threshold exists in the donor cell, the DeNB separately determines the first prediction value and the second prediction value of the total system capacity. The first prediction value is a total system capacity corresponding to a first air interface resource allocation manner, and the second prediction value is a total system capacity corresponding to a second air interface resource allocation manner; in the first air interface resource allocation manner, air interface resources such as PRBs of a same beam are allocated to the RN and the target terminal based on a preset proportion; in the second resource allocation manner, the air interface resources such as the PRBs of the same beam are allocated to the RN and the target terminal in a sequence of priorities; and a priority of the RN is higher than a priority of the target terminal.

3032: The DeNB determines an air interface resource allocation manner for the RN based on the first prediction value and the second prediction value.

In this embodiment of this application, after separately determining the first prediction value and the second prediction value, the DeNB determines the air interface resource allocation manner for the RN based on the first prediction value and the second prediction value.

The DeNB determines the air interface resource allocation manner for the RN based on values of the first prediction value and the second prediction value. When the first prediction value is greater than or equal to the second prediction value, the first air interface resource allocation manner is used to schedule an air interface resource for the RN. When the first prediction value is less than the second prediction value, the second air interface resource allocation manner is used to schedule an air interface resource such as a PRB for the RN.

In this embodiment of this application, when the correlation between the RN and the ordinary terminal device is low, air interface resource scheduling is performed on the RN and an ordinary terminal device in different beams based on a massive MIMO technology. In this way, an air interface resource multiplexing degree is increased, impact on the ordinary terminal device in the donor cell is reduced while a backhaul capability of the RN is improved, and a capacity of an entire system is improved. In addition, when the correlation between the RN and the ordinary terminal device is high, a resource scheduling manner with an optimal total system capacity is used for air interface resource scheduling, so that the total system capacity is the highest.

Figure 5:
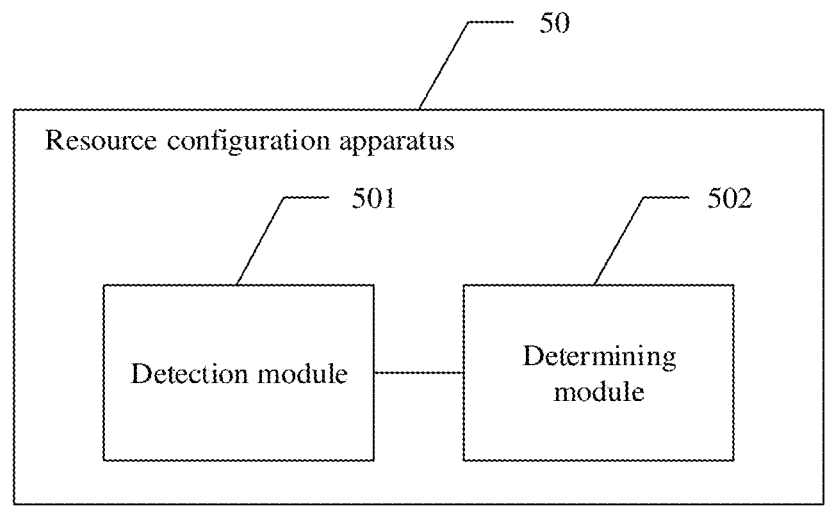
FIG. 5 is a schematic diagram of a structure of a resource configuration apparatus according to an embodiment of this application.

The foregoing describes the resource configuration method provided in the embodiments of this application, and the following describes a schematic diagram of a structure of a resource configuration apparatus in the embodiments of this application. Refer to FIG. 5.

Refer to FIG. 5, a resource configuration apparatus 50 provided in an embodiment of this application includes:

a detection module 501, configured to detect whether a target terminal exists in a donor cell, where a correlation between a wireless air interface channel of the target terminal and a wireless air interface channel of a RN is greater than a target threshold, and the correlation is used to indicate a channel interference degree between the wireless air interface channel of the target terminal and the wireless air interface channel of the RN; and a determining module 502, configured to: when the detection module 501 detects that the target terminal does not exist, determine one or more beams for the RN through resource spatial multiplexing, where the one or more beams are beams formed by a massive antenna array of the DeNB through air interface beamforming, and the one or more beams are used by the RN to perform data backhaul.

According to the resource configuration apparatus provided in this embodiment of this application, air interface resource scheduling is performed on the RN and an ordinary terminal device in different beams by using a massive MIMO technology. In this way, an air interface resource multiplexing degree is increased, impact on the ordinary terminal device in the donor cell is reduced while a backhaul capability of the RN is improved, and a capacity of an entire system is improved.

Optionally, in an embodiment, the determining module 502 is further configured to: when the detection module 501 detects that the target terminal exists, determine a resource allocation manner for the RN and the target terminal by using a scheduling optimization algorithm, so that a total system capacity of the massive MIMO cell meets a preset condition.

Optionally, in an embodiment, the determining module 502 is configured to: when the detection module 501 detects that the target terminal exists, separately determine a first prediction value and a second prediction value of the total system capacity, where the first prediction value is a total system capacity corresponding to a first air interface resource allocation manner, and the second prediction value is a total system capacity corresponding to a second air interface resource allocation manner; in the first air interface resource allocation manner, air interface resources of a same beam are allocated to the RN and the target terminal based on a preset proportion; in the second resource allocation manner, the air interface resources of the same beam are allocated to the RN and the target terminal in a sequence of priorities; and a priority of the RN is higher than a priority of the target terminal; and determine the air interface resource allocation manner for the RN based on the first prediction value and the second prediction value.

Optionally, in an embodiment, the determining module 502 is configured to: determine whether the first prediction value is greater than the second prediction value; and if the first prediction value is greater than or equal to the second prediction value, determine that the resource allocation manner for the RN is the first air interface resource allocation manner; or if the first prediction value is less than the second prediction value, determine that the resource allocation manner for the RN is the second air interface resource allocation manner.

Optionally, in an embodiment, the total system capacity is a sum of a cell capacity of the donor cell and a cell capacity corresponding to the RN.

Figure 6:
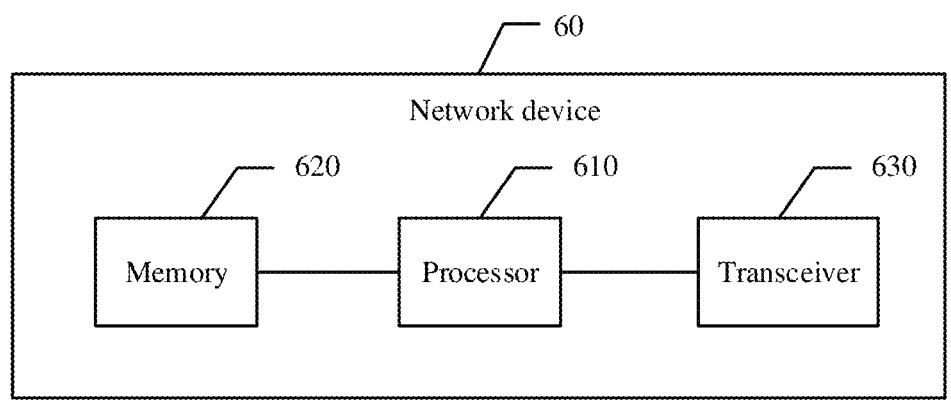
FIG. 6 is a schematic diagram of a structure of a network device according to an embodiment of this application.

As shown in FIG. 6, an embodiment of this application further provides a network device 60. The network device 60 includes a processor 610, a memory 620, and a transceiver 630. The memory 620 stores instructions or a program. The processor 610 is configured to execute the instructions or program stored in the memory 620. When the instructions or program stored in the memory 620 is executed, the processor 610 is configured to perform operations of the detection module 501 and the determining module 502 in the foregoing embodiment.

The network device 60 in this embodiment of this application is a device corresponding to the DeNB in the resource allocation methods in the embodiments of this application, and operations and/or functions of various modules in the network device 60 are to implement corresponding procedures of the methods in FIG. 2 to FIG. 4. For brevity, details are not described herein again.

An embodiment of this application further provides a computer-readable storage medium. The computer-readable storage medium stores a computer program. When the program is executed by a processor, a procedure related to the DeNB in the resource allocation method provided in the foregoing method embodiment is implemented.

An embodiment of this application further provides a computer-readable storage medium. The computer-readable storage medium stores a computer program. When the program is executed by a processor, a procedure related to the DeNB in the resource allocation method provided in the foregoing method embodiment is implemented.

All or some of the foregoing embodiments are implemented by using software, hardware, firmware, or any combination thereof. When software is used to implement the embodiments, all or some of the embodiments are implemented in a form of a computer program product.

The computer program product includes one or more computer instructions. When the computer program instructions are loaded and executed on a computer, the procedures or the functions according to the embodiments of the present disclosure are all or partially generated. The computer is a general-purpose computer, a dedicated computer, a computer network, or another programmable apparatus. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive Solid State Disk (SSD)), or the like.

A person of ordinary skill in the art is able to understand that all or some of the steps of the methods in the embodiments are implemented by a program instructing related hardware. The program is stored in a computer-readable storage medium. The storage medium includes a ROM, a RAM, a magnetic disk, or an optical disc, or the like.

The foregoing describes in detail the resource allocation method, the corresponding resource allocation apparatus, the communication system, and the like that are provided in the embodiments of this application. In this specification, examples are used to describe the principles and implementation manners of the present disclosure. The descriptions in the foregoing embodiments are used to help understand the method and the core idea of the present disclosure. In addition, a person of ordinary skill in the art is able to make modifications in an implementation and an application scope based on the idea of the present disclosure. In conclusion, the content of this specification is not be construed as a limitation to the present disclosure.

What is claimed is:

1. A resource allocation method, wherein the method is applied to a communication system based on massive multiple-input and multiple-output (MIMO), the communication system comprises a donor evolved Node B (DeNB) and one or more relay nodes (RNs) corresponding to the DeNB, and the resource allocation method comprising:
    detecting, by the DeNB, whether a target terminal exists in a donor cell, wherein:
        a correlation between a wireless air interface channel of the target terminal and a wireless air interface channel of a RN is greater than a target threshold; and
        the correlation is used to indicate a channel interference degree between the wireless air interface channel of the target terminal and the wireless air interface channel of the RN, wherein a higher correlation indicates higher channel interference degree; and
    in response to a non-existent target terminal, determining, by the DeNB, one or more beams for the RN through resource spatial multiplexing, wherein the one or more beams are beams formed by an antenna array of the DeNB through air interface beamforming, and the one or more beams are used by the RN to perform data backhaul.

2. The resource allocation method according to claim 1, wherein after the detecting, by the DeNB, whether the target terminal exists in the donor cell, the method further comprising:
    in response to a determination that the target terminal exists, determining, by the DeNB, an air interface resource allocation manner for the RN and the target terminal by using a scheduling optimization algorithm, so that a system capacity of the donor cell meets a preset condition.

3. The resource allocation method according to claim 2, wherein the determining, by the DeNB, the air interface resource allocation manner for the RN and the target terminal by using the scheduling optimization algorithm, so that the system capacity of the donor cell meets the preset condition comprises:
    separately determining, by the DeNB, a first prediction value and a second prediction value of the system capacity, wherein:
        the first prediction value is a system capacity corresponding to a first air interface resource allocation manner, where in the first air interface resource allocation manner, air interface resources of a same beam are allocated to the RN and the target terminal based on a preset proportion; and
        the second prediction value is a system capacity corresponding to a second air interface resource allocation manner where in the second air interface resource allocation manner, the air interface resources of the same beam are allocated to the RN and the target terminal in a sequence of priorities; and
        a priority of the RN is higher than a priority of the target terminal; and
    determining, by the DeNB, the air interface resource allocation manner for the RN and the target terminal based on the first prediction value and the second prediction value.

4. The resource allocation method according to claim 3, wherein the determining, by the DeNB, the air interface resource allocation manner for the RN and the target terminal based on the first prediction value and the second prediction value comprises:
    determining, by the DeNB, whether the first prediction value is greater than the second prediction value; and
    in response to the first prediction value being greater than or equal to the second prediction value, determining, by the DeNB, that the air interface resource allocation manner for the RN and the target terminal is the first air interface resource allocation manner; or
    in response to the first prediction value being less than the second prediction value, determining, by the DeNB, that the air interface resource allocation manner for the RN and the target terminal is the second air interface resource allocation manner.

5. The resource allocation method according to claim 2, wherein:
    the system capacity is a sum of a cell capacity of the donor cell and a cell capacity corresponding to the RN.

6. A resource allocation apparatus, comprising:
    a transceiver;
    at least one processor; and
    one or more memories coupled to the at least one processor and storing programming instructions for execution by the at least one processor to cause the at least one processor to:
        detect whether a target terminal exists in a donor cell, wherein:
            a correlation between a wireless air interface channel of the target terminal and a wireless air interface channel of a relay node (RN) is greater than a target threshold; and
            the correlation is used to indicate a channel interference degree between the wireless air interface channel of the target terminal and the wireless air interface channel of the RN, wherein a higher correlation indicates higher channel interference degree; and
        in response to detecting that the target terminal does not exist, determine one or more beams for the RN through resource spatial multiplexing, wherein the one or more beams are beams formed by an antenna array of a donor eNodeB (DeNB) through air interface beamforming, and the one or more beams are used by the RN to perform data backhaul.

7. The resource allocation apparatus according to claim 6, wherein the programming instructions, when executed by the at least one processor, cause the at least one processor to:
    in response to detecting that the target terminal exists, determine a resource allocation manner for the RN and the target terminal by using a scheduling optimization algorithm, so that a system capacity of the donor cell meets a preset condition.

8. The resource allocation apparatus according to claim 7, wherein the programming instructions, when executed by the at least one processor, cause the at least one processor to:
in response to detecting that the target terminal exists, separately determine a first prediction value and a second prediction value of the system capacity, wherein:
the first prediction value is a system capacity corresponding to a first air interface resource allocation manner, where in the first air interface resource allocation manner, air interface resources of a same beam are allocated to the RN and the target terminal based on a preset proportion; and
the second prediction value is a system capacity corresponding to a second air interface resource allocation manner, where in the second air interface resource allocation manner, the air interface resources of the same beam are allocated to the RN and the target terminal in a sequence of priorities; and
a priority of the RN is higher than a priority of the target terminal;
and
determine the air interface resource allocation manner for the RN and the target terminal based on the first prediction value and the second prediction value.

9. The resource allocation apparatus according to claim 8, wherein the programming instructions, when executed by the at least one processor, cause the at least one processor to:
determine whether the first prediction value is greater than the second prediction value; and
in response to the first prediction value being greater than or equal to the second prediction value, determine that the resource allocation manner for the RN and the target terminal is the first air interface resource allocation manner; or
in response to the first prediction value is less than the second prediction value, determine that the air interface resource allocation manner for the RN and the target terminal is the second air interface resource allocation manner.

10. The resource allocation apparatus according to claim 7, wherein the system capacity is a sum of a cell capacity of the donor cell and a cell capacity corresponding to the RN.

11. A non-transitory computer readable medium including instructions executable by a processor to perform operations comprising:
detecting, in a communication system based on massive multiple-input and multiple-output (MIMO) that includes a donor evolved Node B (DeNB) and one or more relay nodes (RNs) corresponding to the DeNB, whether a target terminal exists in a donor cell, wherein:
a correlation between a wireless air interface channel of the target terminal and a wireless air interface channel of the RN is greater than a target threshold; and
the correlation is used to indicate a channel interference degree between the wireless air interface channel of the target terminal and the wireless air interface channel of the RN, wherein a higher correlation indicates higher channel interference degree; and
in response to a non-existent target terminal, determining, by the DeNB, one or more beams for the RN through resource spatial multiplexing, wherein the one or more beams are beams formed by an antenna array of the DeNB through air interface beamforming, and the one or more beams are used by the RN to perform data backhaul.

12. The non-transitory computer readable medium according to claim 11, wherein the instructions executable by the processor further perform operations comprising:
in response to an existent target terminal, determining, by the DeNB, an air interface resource allocation manner for the RN and the target terminal by using a scheduling optimization algorithm, so that a system capacity of the donor cell meets a preset condition.

13. The non-transitory computer readable medium according to claim 12, wherein the instructions executable by the processor further perform operations comprising:
separately determining, by the DeNB, a first prediction value and a second prediction value of the system capacity, wherein:
the first prediction value is a system capacity corresponding to a first air interface resource allocation manner, where in the first air interface resource allocation manner, air interface resources of a same beam are allocated to the RN and the target terminal based on a preset proportion; and
the second prediction value is a system capacity corresponding to a second air interface resource allocation manner where in the second air interface resource allocation manner, the air interface resources of the same beam are allocated to the RN and the target terminal in a sequence of priorities; and
a priority of the RN is higher than a priority of the target terminal; and
determining, by the DeNB, the air interface resource allocation manner for the RN and the target terminal based on the first prediction value and the second prediction value.

14. The non-transitory computer readable medium according to claim 13, wherein the instructions executable by the processor further perform operations comprising:
determining, by the DeNB, whether the first prediction value is greater than the second prediction value; and
in response to the first prediction value being greater than or equal to the second prediction value, determining, by the DeNB, that the air interface resource allocation manner for the RN and the target terminal is the first air interface resource allocation manner; or
in response to the first prediction value being less than the second prediction value, determining, by the DeNB, that the air interface resource allocation manner for the RN and the target terminal is the second air interface resource allocation manner.

15. The non-transitory computer readable medium according to claim 12, wherein:
the system capacity is a sum of a cell capacity of the donor cell and a cell capacity corresponding to the RN.

* * * * *